Feb. 23, 1960  G. J. CONONI  2,925,977
PIPE HANGERS AND THE LIKE
Filed May 31, 1956  3 Sheets-Sheet 1
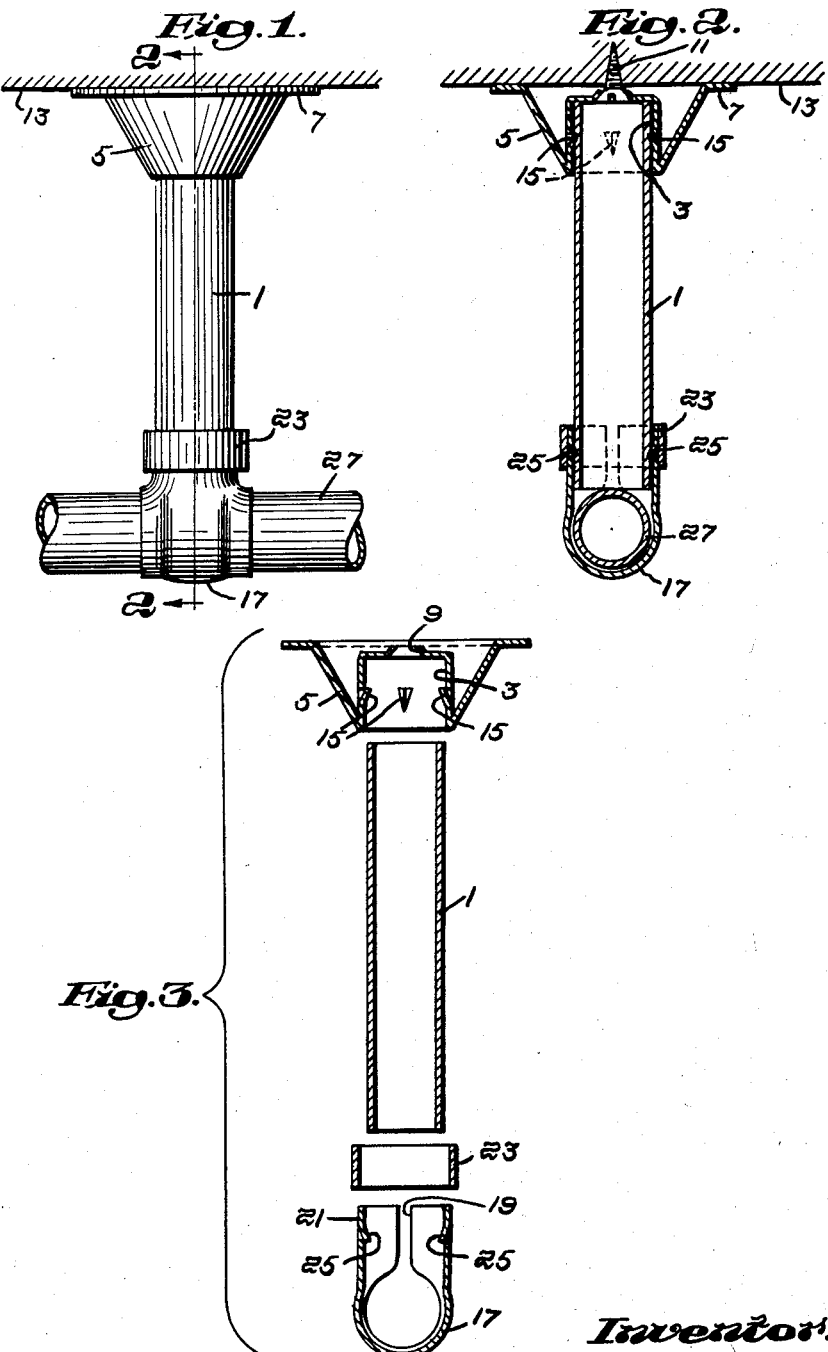
Inventor:
George J. Cononi,
by Robert K. Randall,
Attorney Feb. 23, 1960  G. J. CONONI  2,925,977
PIPE HANGERS AND THE LIKE
Filed May 31, 1956  3 Sheets-Sheet 2
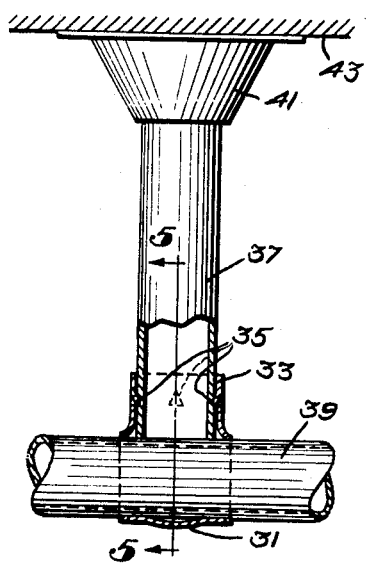
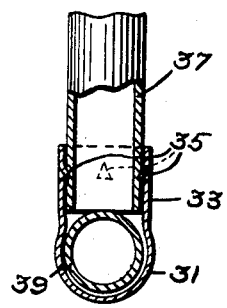
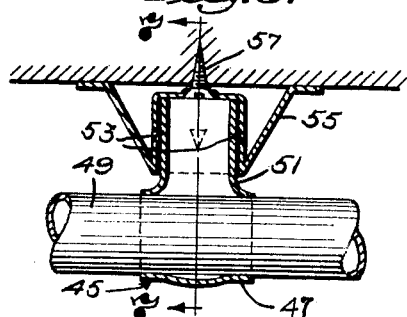
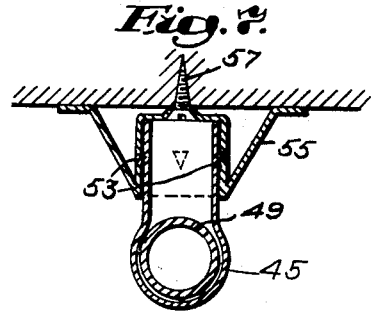
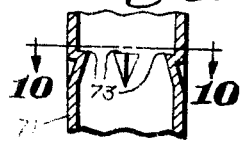
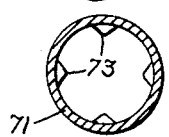
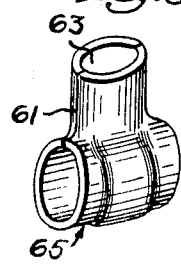
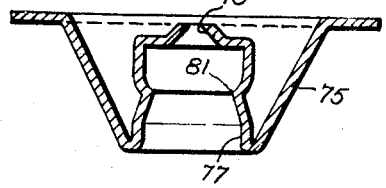
Inventor:
George J. Cononi,
by Robert K. Randall,
Attorney Feb. 23, 1960 G. J. CONONI 2,925,977
PIPE HANGERS AND THE LIKE
Filed May 31, 1956 3 Sheets-Sheet 3
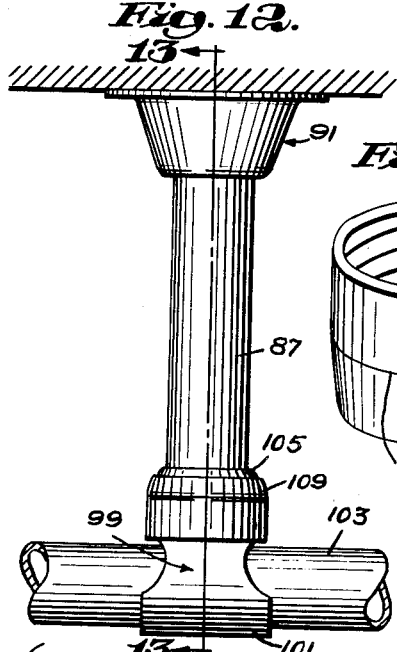
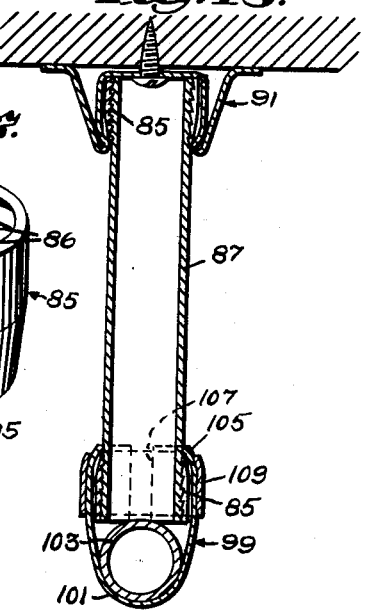
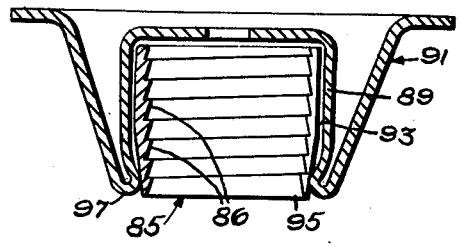
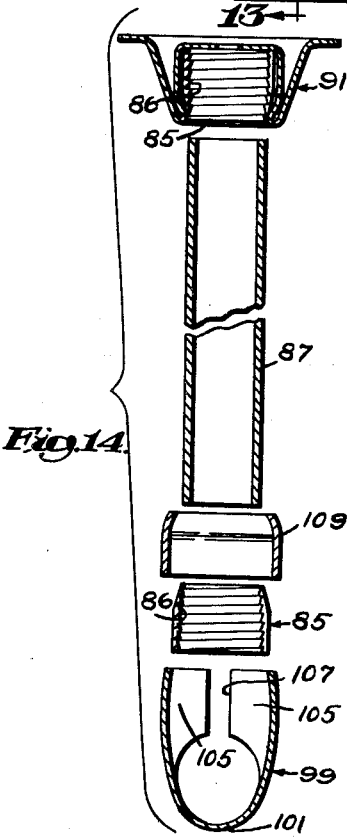
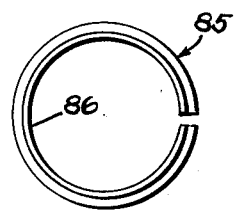
Inventor:
George J. Cononi,
by Robert K. Randall,
Attorney

United States Patent Office 2,925,977
Patented Feb. 23, 1960

2,925,977

PIPE HANGERS AND THE LIKE

George J. Cononi, Wellesley, Mass.

Application May 31, 1956, Serial No. 588,389

14 Claims. (Cl. 248—62)

This invention has relation in general to the joining of cylindrical and tubular structural and functional elements, where one member of circular section is to be entered within or held coaxially to the other, or one element is to be held in a sleeve, ferrule, socket, or other female member.

In particular, the invention principle is shown applied to the production of a pipe hanger, and is a continuation-in-part of my co-pending application Serial No. 416,264, now abandoned, dated March 11, 1954.

The invention has as its object the provision of a novel hanger having many features of improvement avoiding the shortcomings of prior structures of this sort. Thus the hanger of the invention is aimed to be easy and inexpensive to make, simple to use, strong in operation and enduring in construction, adaptable on the job to any length desired, of finished and pleasing appearance, and devoid of sharp corners, angles, and projections capable of injuring the hands and tearing fabrics as well as catching and retaining dust and dirt. Further objects are to provide a pipe hanger easily attachable to ceiling, wall or floor while completely concealing its means of attachment and any holes made therefor in the supporting surface, and which will stand out from such surface in precisely perpendicular relation thereto.

In the construction and use of pipe hangers, the most troublesome problem has usually been to fit the length of the hanger to the requirements of the job in hand. The need for fixing the hanger's pipe-holding element and the support or bracket to opposite ends of the spacing element has nearly always required threading or otherwise providing engaging means on the spacer which limited its length-adjustment. Thus the plumber or steamfitter has been inconvenienced and delayed by having to obtain and provide an extensive assortment of such fitted spacers in order to carry through a job of any substantial proportion, with variations in the length needed at successive locations being the rule.

Under these circumstances, a type of pipe hanger has attained very wide use which permits sections of standard rigid type copper tubing in the widely used half-inch size to be employed as the spacer of a pipe hanger formed simply by sweat-soldering factory-made brackets comprising a foot and a pipe-clamping element to the opposite ends thereof. The decisive advantage here is that the plumber usually has plenty of scraps of such ½" tubing about, and can always cut spacers therefrom, or from standard lengths of such tubing always available, in the precise length required for each and every hanger regardless of variations.

Along with this outstanding virtue, this type hanger has certain disadvantages. The spacer and the two fittings to be soldered to the opposite ends thereof must be heated by a torch while the parts are being sweated together, with the parts held in the exact right-angle relation required, and with ensuing delay while the parts are cooling down to where they may be handled, water for cooling seldom being available during the piping job.

The foot bracket or support attaching the hanger to the ceiling or wall is secured by two screws driven through holes in diametrically opposite radial feet and less than ½" from the installed spacer, making it difficult to drive them straight. The base or support cannot be applied to the ceiling or wall before sweating in the spacer, as the heat of the torch would discolor the surface and create a fire hazard. Since these screws are many times driven into plaster they often fail to get a secure grip, and make disfiguring holes or cracks not concealed by the narrow feet, which is almost always the result when toggle bolts or shields are used. Additionally, the screws pull the feet unequally into the plaster, tilting the pipe hanger into slanting and unsightly relation and bending the pipe out of line. Further, the pipe-clamp or cradle is composed of two yokes, one sweated onto the spacer and the other spanning and clamping the pipe to the first by reason of two screws passing through lugs or flanges extending diametrically away from the pipe at opposite sides thereof. These flanges project out a half-inch or more at each side of the pipe at every hanger, and the screws which draw the flanges together to clamp the pipe also protrude from the flanges. These flanges not only are unsightly through marring the otherwise straight and smooth extent of the pipe line, but they and the sharp-pointed self-threading screws commonly used often inflict painful wounds to the hands of housewives and other persons attempting to dust the pipes; additionally, they form a collecting place for dust and lint. The plumber's hands also are often injured thereby, and additionally by the screw driver in attempting to start the screws of the support into a plaster ceiling or wall.

To remedy these drawbacks while retaining the essential advantage of being able to use sections of tubing to make the hanger exactly the length needed, the invention comprises a pipe hanger having a pipe-holding cradle and a bracket or support, each of which is self-locking on a cylindrical spacer, for example, a length of unthreaded tubing, without the use of solder and without the need for any surface treatment or any other preparation of the spacer beyond cutting it to the desired length.

Thus in the first illustrated form the invention comprises a spacer made of tubing, wood, or other round section stock, which is engaged by sharp teeth struck up or otherwise projected inwardly from the component metal of a socket, sleeve, or tubular portion in operatively fixed relation to the pipe-holding cradle and engaging the outside surface of the shank, and by similar sharp teeth struck up or otherwise projected inwardly inside a socket formed in the sheet metal base or support of the pipe hanger. These teeth have their sharp points disposed at locations in a circle of lesser diameter than the outside diameter of the stock or tubing forming the spacer, so that the teeth press strongly against the spacer when the latter is driven into the sleeve or socket, and dig into the stock or tubing forming the spacer to forcibly resist reverse movement by reason of the appropriate slant or rake of the teeth imparted thereto for this purpose.

In one form of the invention proven valuable in practice, the teeth are formed inside a separate split sleeve fitting within a socket having a constricted mouth, the outside of the split sleeve being tapered so as to wedge in the socket and prevent its withdrawal, while the wedging action contracts the sleeve about the spacer and sets the teeth into the shank.

The support of the hanger is fastened to its supporting surface by a single screw axially disposed within the socket holding the spacer, and thus completely hidden, while the wide circular flange of the support gives greatly increased lateral stability in all directions and hides any holes which might be made in the supporting surface in the course of attaching the hanger thereto. The pipe-holding cradle, whether made split for easy application to the pipe or in one piece, has no screws, lugs, or any other projections to mar its pleasing stream-lined appearance, to catch dust, or to injure the hands. The cradle and the support are easy and cheap to manufacture, are assembled with the spacer provided by the plumber himself, in the simplest possible manner merely by manual pressure, and hold with a grip far stronger than needed to bear the weight of the pipe and usually greater than the grip of the mounting screw in the ceiling or wall.

Other objects of the invention, and the manner of attainment thereof, are as set forth hereinafter.

Illustrative embodiments of the invention are shown in the accompanying drawings in which, Fig. 1 is a side elevation of the pipe hanger attached to a ceiling, and supporting a pipe.

Fig. 2 is a section on line 2—2 of Fig. 1.

Fig. 3 is an exploded view of the pipe hanger of Figs. 1 and 2.

Fig. 4 is a view similar to Fig. 1, showing an alternative form of the pipe-holding element, certain parts being broken away.

Fig. 5 is a section on line 5—5 of Fig. 4, also with certain portions broken away.

Fig. 6 is a vertical longitudinal section of a short pipe hanger for close mounting of a pipe.

Fig. 7 is a transverse section of the same on line 7—7 of Fig. 6.

Fig. 8 is a perspective view of a one-piece pipe-holding element forming a modification.

Fig. 9 is an axial half-section of a portion of a socket forming a part of a pipe hanger base or support, showing a different form of tooth therein.

Fig. 10 is a section on line 10—10 of Fig. 9.

Fig. 11 is a section of the pipe hanger support, showing another alternative form of tooth in its socket.

Fig. 12 shows another form of the invention, attached to a ceiling and supporting a pipe.

Fig. 13 is a vertical section on line 13—13 of Fig. 12.

Fig. 14 is an exploded sectional view of the same.

Fig. 15 is an enlarged section of the base or support of the hanger of Fig. 14.

Fig. 16 is a bottom plan view of the split toothed sleeve employed in the form of Figs. 12 to 15.

Fig. 17 is a perspective view of the sleeve of Fig. 16.

The embodiment of Figs. 1 to 3 comprises a spacer portion 1, consisting of a length of standard unthreaded rigid tubing of any desired diameter, conventionally made of copper, the upper end of which is forced into a cylindrical socket or inverted cup 3 integrally formed and axially disposed in a support or base 5 of truncated conical shape and having an annular flange 7 extending radially therefrom. An axial countersunk hole 9 is formed in the otherwise closed bottom of cup or socket 3, to receive a single retaining screw 11 forming the sole means required to fix the pipe hanger in place, for example, as here shown, to the ceiling 13. This base or support 3 is preferably a unitary sheet steel stamping. When fixed to the cylinder, the screw is concealed, the flange 7 being of a diameter to conceal that portion of the ceiling which immediately surrounds the screw.

Teeth 15 are provided at a plurality of points around the interior wall of socket 3, by striking inwardly portions of the component metal which are of V-shape when viewed both axially and radially. Preferably the component metal is cut through and freed along a radial plane at the broad end of the V, so as to form a sharp end which will actually bite into the metal of the tubing forming the spacer 1, with the production of an accompanying burr, and thus will prevent withdrawal of the spacer beyond the negligible amount of movement required for the teeth to dig in, except through the expenditure of a relatively great amount of force capable of causing the teeth to score the tubing so as to carve their way to the end of spacer 1. The teeth 15, as is obvious, through their rake inwardly of and toward the perforated bottom of cup or socket 3 act as barbs permitting easy entrance of the spacer but blocking reverse movement.

The sharp ends of the teeth 15 are arranged in a circle whole diameter is slightly less than the outside diameter of the tubing or spacer 1, so that distortion of the cross-section of both the socket and the end of the spacer occurs when the latter is thrust into the socket. It is the attempt of these parts to recover their original circular shape which gives the teeth 15 a powerful inward pressure enabling them to bite into the walls of the tubing.

The cradle 17, also a sheet steel stamping, comprises the tubular shank which is split as indicated at 19 to enable it to be spread for entry of the pipe laterally thereinto. When wrapped around the pipe, the two sides, defining the split shank 21 are brought back toward each other into mutually parallel relation and a ring 23 is slipped over them. The shank 21 is provided with teeth 25 identical with the teeth 15 just described, in shape and construction and in the relative diameter of the circle in which their points lie, as determined by ring 23, so as to perform exactly as described of the teeth 15 in locking onto the unthreaded surface of the tubing forming the shank 1. The ring 23 fits easily over split shank 21 after the two halves have been brought into the position shown, following insertion of the pipe 27, but prior to insertion of the spacer 1. The ring 23 merely holds the points of teeth 25 far enough inward to ensure a powerful grip upon spacer 1 when the latter is forced into the socket formed by split shank 21, by reason of the action described of socket 3.

In using the improved hanger to hang pipe, the plumber simply affixes the bases or supports 5 to the ceiling or wall at the desired points along the line to be followed by the pipe, by driving the single retaining screw 11 of each base exactly on the line. He then places a corresponding number of cradles 17 on the pipe at spaced points roughly corresponding to the spacing of the bases 5 on the ceiling or wall, applies the rings, inserts a spacer in each split shank 21 thereof by manual pressure sufficient merely to keep the spacer into place, raises the pipe and enters one end thereof in the fitting used to connect it to the preceding length of pipe; enters the parts of the hanger together by a blow of the hand against the cradle 17 and the adjoining areas of pipe 27. This not only forces the upper end of spacer 1 home against the bottom of socket 3, but also completes the entry of the lower end of spacer 1 into split sleeve 21 until stopped by engaging the pipe 27 therein.

In this manner the pipe is sustained in its elevated position while the joining of its end to the preceding length of pipe is finished. This completely eliminates the prior usual nuisance and expenditure of time incident to hanging the pipe from the ceiling by strings, while joining the pipe to the line. Each pipe-holder 17 permits rotation and sliding of pipe 27 therethrough, as required to enter the end of a length of tubing into a sweat fitting on the end of the preceding length of pipe, or to screw a threaded length of pipe into the corresponding coupling, as well as to allow for expansion and contraction.

When the joining is completed, the spacers of the remaining pipe hangers are entered into their appropriate bases or supports 5, whereupon one or two strokes of the hand against the cradle 17 of each hanger serves to fix the parts permanently in assembled relation with the teeth 15, 25 firmly engaged with the spacer 1.

As is obvious, not only will base or support 5 with its single centrally disposed retaining screw 11 assume a position with its flange 7 flat against the ceiling wall or floor and thus hold spacer 1 precisely perpendicular to such surface, but the skirt and flange of the base 5 will cover a hole of any diameter, in reason, which may be made for the attaching means, as for instance where a toggle bolt replaces screw 11 to hold the device to lath and plaster, or where a shield, so-called, is inserted in masonry to receive the screw.

Figs. 4 and 5 show an alternative embodiment of the same invention principle, in which, instead of the split sleeve and ring type of cradle, such element 31 is formed as a hub having at right angles a continuous, i.e., unsplit, shank 33 forming a socket which does not need the ring 23 to hold its teeth 35 in tightly gripping relation with the tubing 37 forming the spacer of the pipe hanger. This form of pipe-holder 31 has to be slid endwise onto the pipe 39 which is to be sustained by the hanger, whereas the form of Figs. 1 to 3 can be applied laterally to embrace the pipe, a more convenient arrangement, as where a new hanger is to be applied to a pipe line already in place. The base or support 41 is constructed and affixed to the spacer 37 and the surface 43 just as in the form of Figs. 1 to 3.

Figs. 6 and 7 show the manner of employing the invention principle to form a close hanger, so-called, for use where it is desired to mount a pipe close to a ceiling, wall, floor or other surface but out of direct contact therewith. In this form the cradle 45 comprises a hub 47 to receive pipe 49 and an integral unsplit shank 51 serving as the abbreviated spacer and made of the same outside diameter as the tubing intended to be used in the two forms described, and formed without teeth. This shank 51 thus will be seized and held by the teeth 53 of a base or support 55 corresponding in all respects with base 5 of Figs. 1 to 3 and 41 of Fig. 4. That is, the extension spacer 1 or 37, of the other forms is dispensed with entirely, and the attaching shank of the cradle, of reduced diameter, is pushed into and fixed directly in the socket of the support which is attached to the ceiling, wall or floor by the screw 57. Alternatively, the cradle will be made as in Fig. 8, where the shank 61, 63 of the holder 65 is split diametrically on the plane of the axis of the hub and clear down to the passage through such hub, enabling easy lateral introduction of the pipe (not shown) thereinto. The socket inside the base or support receives and holds the split sleeve 61, 63. Though split, its outside diameter, when the edges of the split are closed together, as shown, is such that it will enter the socket with some difficulty and will exert considerable pressure radially outward against the teeth 53 in the socket, thus producing the same locking action as described in connection with teeth 15, 25, 53.

When these hangers are made for supporting copper tubing, the cradle and base or support will be copper plated. Chrome or other bright plating will of course be used to match piping of such finish; especially for the close hangers when used in bathrooms.

While the teeth 15, 25, 35, 53 are cut free at their wide ends, to form a point which sets like a barb on a fish hook to permit easy movement in one direction but to dig in to prevent reverse movement, it has been found that similar V-shaped teeth may be struck up by a suitable tool without cutting free the portion of greatest radial displacement, to make barbed teeth which will let the parts be driven together easily and yet oppose several times the resistance to withdrawal. Such teeth are shown at 73 in Figs. 9 and 10, and as hereinbefore are of V-shape when viewed both axially and radially. These teeth are thus of pyramidal shape, with one face formed in a radial plane. They may be used of course in any of the locations where the teeth 15, 25, 35, and 53 occur.

Fig. 11 shows the concept of the plurality of teeth disposed around the socket in the base or support or in the shank of the cradle carried to its logical conclusion to produce a continuous tooth 81 extending inward around the entire circuit in the socket 77 of base 75. This continuous tooth 81 is in the shape of a projecting acute ridge, herein integral, extending at least one turn around the interior of the socket, which ridge has a relatively gradually sloping wall toward the open end of the socket and an abrupt wall toward the closed end of the socket having the screw hole 79. The space measured across the ridge 81 is slightly less than the diameter of the tubing forming the spacer or of the shank such as 51, 61, of the cradle, so as to hold the latter securely when driven or pushed into the socket 77.

The form of the invention shown in Figs. 12 to 17 has been found to have practical advantages in large-scale production. The teeth which are used in accordance with the principle of the invention to seize and hold the spacer 87 are provided on the inside surface of a separate element 85 in the form of a split steel sleeve of slightly lesser internal diameter than the outside diameter of the standard half-inch rigid copper tubing forming the spacer 87. By making these teeth 86 continuous in the form of a screw thread of buttress type covering all or most of the interior surface, the area of gripping engagement between the spacer and this holding element are greatly multiplied.

The support 91 corresponds in the main to the bases or supports 5, 41, 55, previously described, except in the following respects. The teeth are omitted from the interior surface of the socket 89, since they are now supplied by the salient portions of the buttress thread inside the split sleeve 85, which fits loosely inside the socket 89, the inclined faces of the teeth formed by the threads slanting toward the socket's bottom. The outside surface of sleeve 85 is tapered for approximately half its length from the point 93 to the end 95 nearer the mouth of socket 89, and after the base or support has been formed the split sleeve 85 is dropped into its big end first and the mouth of socket 89 is swaged inwardly as indicated at 97 to a diameter less than the outside diameter of the untapered portion of sleeve 85. Thus sleeve 85 is confined loosely in socket 89, but beyond possibility of escape during shipment or extraction in use.

When the spacer 87 is inserted within sleeve 85 occupying the socket 89 of the base or support, the split sleeve is expanded thereby to admit the end of the spacer easily, but its contractive force combines with the rake of the teeth 86 to prevent relative motion in the reverse direction and locks the sleeve on the spacer. Dimensions may be employed such that the split sleeve as well as the spacer become operatively fixed in the base against both end play and rotational motion. This fixed relation is not necessary, however, because the slightest outward movement of the spacer from the socket brings the tapered portion of the split sleeve into wedging and jamming relation with the swaged-in constricted mouth 97 of socket 89, through which the sleeve cannot pass when distended by the shank, and the inward pressure of the swaged-in mouth of the socket tightens the grip of the buttress thread or teeth upon the spacer, causing them to bite into its surface ever deeper as the pull is increased.

In addition to the tighter grip and greater holding power thus attained, this construction simplifies the process of manufacture, through reducing the number of dies and operations required in forming the base 91, while the split sleeve is easily, cheaply, and rapidly produced by an automatic screw machine in a single operation out of steel tubing such as electrical conduit, the threading, reaming, tapering, splitting, and cutting off being effected rapidly in a single machine operation. It is noted that the mouth of the tapered end 95 of the split sleeve is beveled very slightly on its internal surface, to facilitate entering the spacer therein, so that the latter needs no preparation beyond cutting it to the proper length with the common rotary tubing cutter used by plumbers.

The cradle 99 is in the split or wrap-around form as described hereinbefore, partly encircling the pipe 103 to be supported by the hanger. The two concave sides 105 define the shank portion which has to receive the end of spacer 87, and they each encircle less than half the diameter of the spacer so that their opposed edges 107 stand in spaced relation. Before combining the cradle 99 with the spacer 87, a split shank 85 is inserted in the sleeve portion defined by the two sides 105 big end first, and the continuous band or ring 109 which is used to clamp the shank portions 105 about the split sleeve 85 and the spacer is pushed down loosely toward the pipe. Then the spacer is inserted in the split sleeve, and the ring slid toward the pipe till tight on the shank portion formed by the sides 105.

The operation of the parts is substantially as just described in connection with socket 91. The extremities of the side portions 105 are swaged inward on a taper throughout their extent around the spacer 87, and ring 109 is similarly tapered at its corresponding end so as to wedge over the portions 105 and hold them clamped securely against the split sleeve 85 on spacer 87. As in the case of socket 91, this forms a socket with a constricted mouth into which the tapered outer end of split sleeve 85 wedges and binds when spacer 87 starts to move outward. This forces the teeth 86 of the buttress thread into the spacer, locking these parts together immovably, while the tapered part of sleeve 85 locks within the constricted mouth defined by the in-curved ends of portions 105. This locking prevents both withdrawal and end play of the spacer, though permitting easy rotation of the pipe in the cradle. Commonly the end of the split sleeve 85 stands well below the ends of portions 105, and out of sight.

Disassembly of the hanger is most simply effected if need therefor should arise. At the base or support end, spreading of the split in the end of sleeve 85 with a knife point or other slim tool, where such end is exposed at the mouth of socket 89, instantly releases the spacer. The cradle 99 is freed by merely sliding the ring 109 off from the sleeve portions 105, by finger pressure, whereupon the cradle 99 is free to fall off or be slid off from the spacer and split sleeve. Since no destructive forces are applied to the parts in taking the hanger apart, the members are in readiness for reassembly by the same steps already described, and the operation repeated as often as desired.

As is obvious, the cradle 45, 65, of Figs. 6, 7 and 8, is equally well adapted for use in the base or support equipped with the split internally threaded sleeve 85 when a close hanger is desired. The extension spacer 87 of Figs. 12 to 14 is dispensed with, and the shank 51, 61 of the pipe-holder is inserted and pushed home within split sleeve 85 occupying the socket in the base or support. This shank is, for this purpose, made of identical outside diameter with the standard rigid copper pipe otherwise used for the spacer 87.

It is contemplated, in certain instances, to make the cradle with a continuous, i.e., unsplit, sleeve or shank corresponding to 33 of Figs. 4 and 5, omitting the integral teeth 35 thereof and substituting the split internally threaded sleeve 85 therefor, the mouth of the socket in the shank being swaged in as in socket 89 of Fig. 15.

As noted at the outset, the pipe hanger represents only one useful application of the inventive principle, which obviously admits of use in many other analogous situations, as in television antennas, railings, pipe fences, and the like, where a cylindrical element is desired to be retained or fixed in a hole, socket, or other female element, or attached coaxially to a sleeve, shank, ferrule, or other tubular member, quickly and easily and without the need for special surface treatment of the entering element, and with or without the feature of quick detachability and removal.

While I have illustrated and described certain forms in which the invention may be embodied, I am aware that many modifications may be made therein by any person skilled in the art, without departing from the scope of the invention as expressed in the claims. Therefore, I do not wish to be limited to the particular forms shown, or to the details of construction thereof, but what I do claim is:

1. A device for use in suspending a pipe from an elevated support by the use of a length of tubing having a smooth, unthreaded exterior surface, said device comprising a unitary piece of material of a shape to define a socket, open at its lower end and having a top closure provided with a central aperture for the reception of an attaching element, and retaining means within the socket which becomes operative, solely in response to the pushing of the tubing upwardly into the socket, to apply a biting pressure to the tubing such as to prevent its withdrawal except in response to force such as to score the metal of the tubing.

2. A pipe hanger comprising a support, including a cylindrical socket portion open at its lower end, a cylindrical suspension element having a smooth, unthreaded peripheral surface, a cradle comprising a part operative to receive the pipe to be suspended, and a substantially cylindrical shank portion having a socket which is open at its upper end, each of said socket portions being of a normal diameter to receive an end of said unthreaded suspension element, and means within each of said sockets, respectively, operative solely in response to the pushing of an end portion of the suspension element into the respective socket, to grip the cylindrical element with a biting action such that the suspension element may not be withdrawn accidentally from either socket except in response to force sufficient to score the surface of the material of the suspension element.

3. A pipe hanger according to claim 1, wherein the means for normally retaining the tubing within the socket comprises a unitary split, resilient sleeve having an internal cutting edge, the normal internal diameter of the sleeve being such that introduction of the end portion of the tubing into the sleeve causes the cutting edge to press against the surface of the tubing with force such as to prevent withdrawal of the tubing, the lower end portion of the sleeve being so exposed below the socket as to permit the application of a tool for expanding the sleeve, thereby to allow withdrawal of the tubing.

4. A pipe hanger according to claim 3, wherein the lower end of the socket is so constricted in diameter as to prevent escape of the sleeve, and the split sleeve is tapered externally whereby, in response to force tending to withdraw the tubing from the socket, the tapered surface of the sleeve, by contact with the constricted lower end of the socket wall, causes the cutting edge of the sleeve to bite into the substance of the spacer.

5. A pipe hanger according to claim 2, wherein the means within each respective socket for gripping the cylindrical element with biting action comprises an internally screw-threaded split sleeve of resilient metal, the screw thread being of the buttress type, with the sloping face of the thread of that sleeve which is within the socket of the support inclining downwardly and outwardly, and with the screw thread of that sleeve which is within the socket of the cradle having its inclined face sloping upwardly and outwardly, and means to prevent each sleeve from being withdrawn from its respective socket.

6. A pipe hanger comprising, in combination, a support, a length of unthreaded tubing and a cradle, the support consisting of a unitary piece of shape-retaining metal, including an inverted cup portion open at its lower end and having a top closure provided with a central opening for the reception of a fastener for attaching the support to the ceiling, the support also comprising means operative automatically, solely in response to the introduction of the upper end of the unthreaded tubing into the cup, to create a seizing pressure against the unthreaded surface of the tubing such as to prevent its withdrawal from the cup except in response to a force such as to result in a scoring of the tubing, the cradle comprising a part of a shape and size to receive the pipe which is to be suspended and a tubular shank portion open at its upper end and having a socket of an internal diameter to receive the lower end of the unthreaded tubing, and means operative automatically to create a seizing pressure against the unthreaded surface of the tubing, resultant solely from the pushing of the end portion of the tubing into said socket, such as to prevent removal of the cradle from the tubing except in response to a force such as to cause scoring of the surface of the tubing.

7. A pipe hanger according to claim 6, wherein the shank portion of the cradle is split diametrically at opposite sides, and having means normally operative to prevent expansion of said shank portion.

8. A pipe hanger according to claim 6, wherein the shank portion of the cradle is tubular, split lengthwise to permit it to be expanded, and has an inwardly bent rim portion at its upper end, and a split sleeve of resilient metal disposed within said shank portion and normally retained therein by the inwardly bent rim of the latter, said sleeve having an internal screw thread of buttress type, the sloping face of the thread inclining downwardly and inwardly, the diameter of the edge of said screw thread being such that when the unthreaded tubing is forced downwardly into the sleeve, the latter is expanded and the edge of the screw thread is so pressed against the tubing as to bite into the substance of the tubing and score the latter in response to force sufficient to withdraw the tubing from the sleeve, and a ring which normally embraces the upper portion of the shank of the cradle and thereby prevents its expansion.

9. A pipe hanger according to claim 6, wherein the means for creating seizing pressure against the upper end portion of the unthreaded tubing comprises a split sleeve of resilient metal located within the cup portion of the support and having an internal screw thread of buttress type, with the sloping face of the thread inclining upwardly and inwardly, means normally operative to prevent the sleeve from escaping from the cup, the normal diameter of the edge of the screw thread in the sleeve being less than the external diameter of the unthreaded tubing, whereby, when the latter is forced upwardly into the sleeve, the latter is expanded and the edge of its screw thread contacts the tubing with such pressure as to cut into the latter in response to force tending to withdraw the tubing from the cup.

10. A device for use in suspending a pipe from an elevated part by the use of a spacer consisting of a length of tubing having a smooth unthreaded exterior surface, said device comprising a support consisting of a unitary piece of material of a shape to provide an inverted cup portion or socket open at its lower end and having a top closure provided with a central opening for the reception of a fastener for attaching the support to a ceiling or the like, the support also comprising a downwardly tapering portion integrally joined at its lower edge to the lower edge of the cup portion and which merges at its upper edge with an outwardly directed, circular ceiling-contacting flange of a diameter such as to conceal a substantial area of the ceiling surrounding the fastener by means of which the support is attached to the ceiling, and means operative automatically, in response to the introduction of the upper end of the unthreaded tubing into the socket, to create a seizing pressure against the unthreaded surface of the tubing sufficient to prevent its withdrawal from the socket, and wherein the means for creating the seizing pressure comprises a split sleeve of resilient metal located within the cup, the lower end of the cup being of a diameter such as to prevent the sleeve from escaping from the cup.

11. A device according to claim 10, wherein the split-sleeve has an internal screw thread of buttress type with the sloping surface of the thread inclining downwardly and outwardly.

12. In combination, in a device for supporting an article in elevated position by the use of an elongate, rigid, cylindrical spacer element having a smooth unthreaded exterior surface, said device comprising a support having provision for the reception of fastener means for attaching it to a fixed part, and an article-holding member having provision for securing it to the article which is to be supported, the support and the article-holding member each having an open ended socket, a split, resilient internally toothed sleeve within each respective socket, each socket being of reduced diameter at its open end thereby to prevent escape of the sleeve from the respective socket, the normal diameter of each sleeve being such that when one end portion of an elongate, smooth surfaced, cylindrical spacer element is pushed into the sleeve, the latter is thereby slightly expanded so that its teeth press against the peripheral surface of the spacer element, the teeth of each sleeve being so shaped that in response to force tending to withdraw the spacer element from the respective sleeve, the teeth of the latter tend to bite into the substance of the spacer element, each sleeve being externally tapered toward the open end of its respective socket, and of an external diameter such that force, tending to withdraw the sleeve from the socket, reduces the effective internal diameter of the sleeve, thereby forcing the teeth into the substance of the spacer element.

13. In a pipe hanger, in combination, a support having a downwardly open socket provided with a constricted mouth, a cradle comprising pipe-holding means, said cradle also having an upwardly open socket with a constricted mouth, a unitary internally toothed, split, resilient sleeve within each respective socket, each sleeve being of a maximum external diameter such that it cannot be withdrawn from its socket although being loose within is socket, and an elongate cylindrical spacer, having a smooth unthreaded peripheral surface, one end portion of the spacer being disposed within each of said sockets, respectively, the diameter of the spacer being such that its presence within the sleeve results in an expansion of the sleeve such as to cause the teeth to press against the spacer.

14. In a pipe hanger, in combination, a support having a socket at its lower end, a split, resilient sleeve within the socket, the sleeve having a toothed interior surface, means normally preventing escape of the sleeve from the socket, a pipe cradle having a tubular shank portion having a smooth, unthreaded external surface, the external diameter of the shank portion being such that it may be pushed upwardly into said sleeve, thereby expanding the latter so that its teeth so press against the peripheral surface of the shank portion that, in response to the application of force such as to withdraw the shank portion from the sleeve, the teeth of the sleeve bite into said shank portion with scoring pressure.

References Cited in the file of this patent

UNITED STATES PATENTS

| | | |
|---|---|---|
| 64,654 | Floyd | May 14, 1867 |
| 376,810 | Brill | Jan. 24, 1888 |
| 487,434 | Steen | Dec. 6, 1892 |
| 766,890 | Newberg | Aug. 9, 1904 |
| 1,096,282 | Boehm | May 12, 1914 |
| 1,158,633 | Carpenter et al. | Nov. 2, 1915 |
| 1,315,890 | Wheeler | Sept. 9, 1919 |
| 1,491,742 | Benckenstein | Apr. 22, 1924 |
| 1,791,929 | Koering | Feb. 10, 1931 |
| 1,817,774 | Sipe | Aug. 4, 1931 |
| 1,817,775 | Sipe | Aug. 4, 1931 |
| 2,158,802 | Redlon | May 16, 1939 |
| 2,357,755 | Moll | Sept. 5, 1944 |
| 2,539,783 | Kirk | Jan. 30, 1951 |

FOREIGN PATENTS

| | | |
|---|---|---|
| 113,791 | Sweden | Apr. 10, 1945 |
| 256,380 | Great Britain | Aug. 12, 1956 |